United States Patent [19]

Harrigill, Jr. et al.

[11] 4,092,712
[45] May 30, 1978

[54] REGULATED HIGH EFFICIENCY, LIGHTWEIGHT CAPACITOR-DIODE MULTIPLIER DC TO DC CONVERTER

[75] Inventors: William T. Harrigill, Jr., Brunswick; Ira T. Myers, Westlake, both of Ohio

[73] Assignee: The United States of America as represented by the Administrator of the National Aeronautics and Space Administration, Washington, D.C.

[21] Appl. No.: 801,432

[22] Filed: May 27, 1977

[51] Int. Cl.² ............................................. H02M 7/00
[52] U.S. Cl. ....................................... 363/60; 363/16; 363/101
[58] Field of Search ....................... 307/44, 46, 48, 51, 307/109, 110; 363/59–61, 95, 97, 101

[56] References Cited

U.S. PATENT DOCUMENTS 2,570,014  10/1951  Schenau et al. ................... 363/59 X
2,962,649  11/1960  Baum ..................................... 363/59

Primary Examiner—William M. Shoop
Attorney, Agent, or Firm—Norman T. Musial; John R. Manning; James A. Mackin

[57] ABSTRACT

There is disclosed a voltage multiplier having a capacitor-diode voltage multiplying network which is fed with voltage pulses from a d-c source through a first switching means. Pulses of a second polarity are also supplied through a second switching means to the input of the capacitor-diode voltage multiplier from a second d-c source whose voltage is adjustable to change the voltage of the pulses of second polarity. The switching means are alternately rendered conducting by signals from a control circuit. The second d-c source may be controlled by a voltage comparator which compares the output voltage of the capacitor-diode voltage multiplier to the reference source.

13 Claims, 1 Drawing Figure

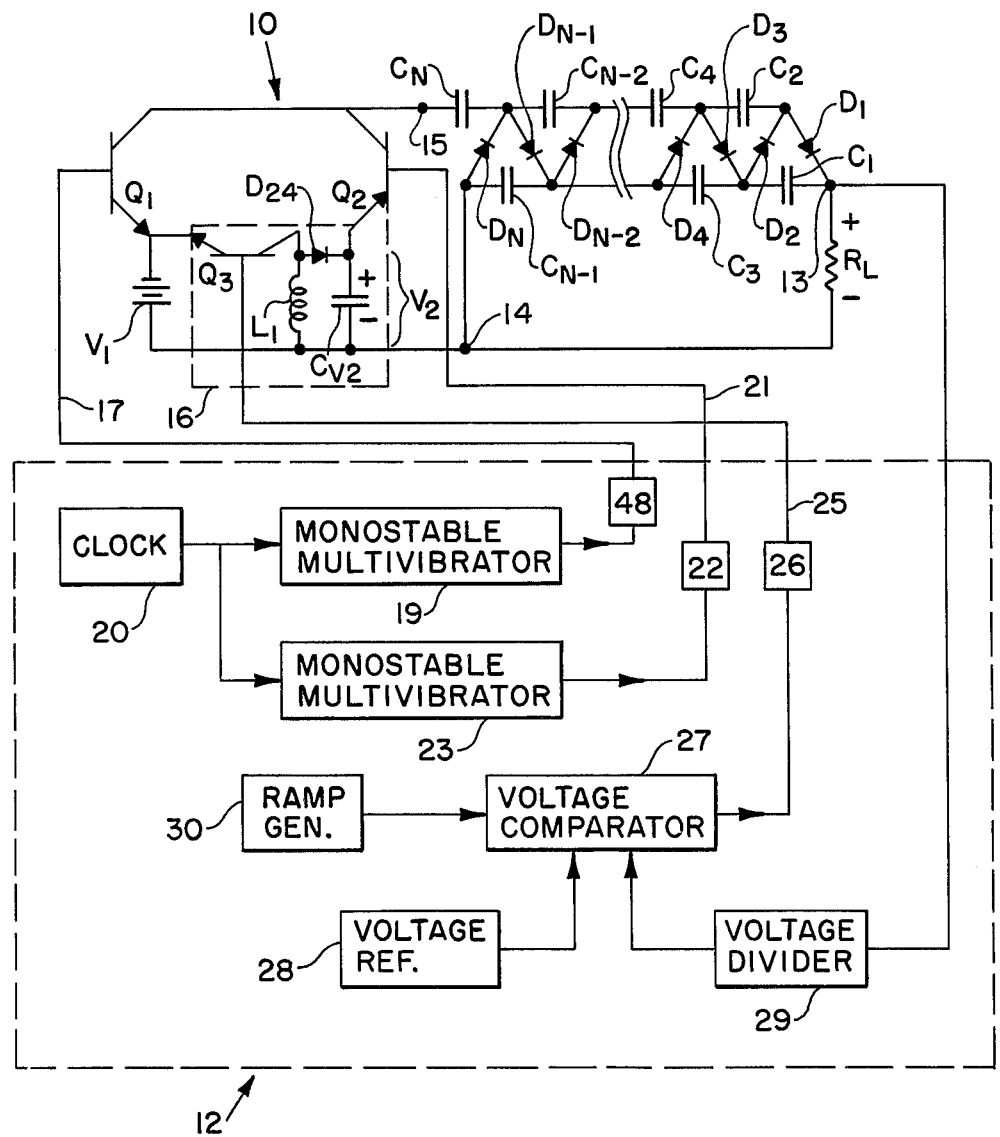

REGULATED HIGH EFFICIENCY, LIGHTWEIGHT CAPACITOR-DIODE MULTIPLIER DC TO DC CONVERTER

ORIGIN OF THE INVENTION

This invention was made by employees of the United States Government and may be manufactured or used by or for the Government of the United States without the payment of any royalties thereon or therefor.

BACKGROUND OF THE INVENTION

This invention relates to d-c to d-c converters and is directed more particularly to a converter having a regulated, high-voltage d-c output.

One of the primary considerations in any type of spacecraft is the weight of such craft. Generally, weight must be kept to a minimum consistent with the spacecraft carrying out its intended function. Spacecraft such as communication satellites, electric thrusters and electron bombardment ion thrusters as well as numerous other applications require regulated, d-c high voltages for some operational functions.

Because of the weight penalty imposed by batteries on spacecraft, various solar cell arrays of light weight have been developed to provide d-c power for many spacecraft. The solar array provides a d-c voltage which may then be converted to high d-c voltage. For example, it may be desireable to obtain 1000 volts d-c from a solar array having 100 volts d-c output. Because of the output voltage of the solar array fluctuates due to various conditions, voltage regulation must be provided to maintain the high voltage required by the spacecraft at a relatively constant value. In order to minimize weight, the elimination of inductors and transformers is also desireable. Another reason for eliminating inductors and transformers is to avoid the magnetic fields associated with such devices.

DESCRIPTION OF THE PRIOR ART

Numerous voltage regulators for d-c circuits are known in the prior art. These include pulse width modulation type circuits utilizing a switching circuit or chopper to supply rectangular voltage pulses to either a transformer or a voltage multiplier network. Dissipative type regulators wherein a variable conductive device is connected in series or shunt with the output voltage are well-known but cause high power losses and are generally unsuitable for solid state circuits.

Another type of voltage regulator is a chopper circuit connected in series between the output and the load of a power supply. For high voltage output circuits, such choppers would require expensive transistors which, nevertheless, would have a high probability of failure. Total preregulation of the d-c source voltage could also be used utilizing buck, buck-boost, or boost methods. All of the foregoing methods in general impose a serious penalty in weight and/or efficiency because the full power of the d-c to d-c converter must be processed by the voltage regulator circuit.

OBJECT AND SUMMARY OF THE INVENTION

It is an object of the invention to provide a d-c to d-c converter having regulated output voltage yet achieving extremely high efficiency and light weight.

It is another object of the invention to provide a d-c to d-c converter having a regulated high voltage output and in which only a portion of the total output power is handled by the voltage regulating circuit provided therein.

Yet another object of the invention is to provide a d-c to d-c converter energized alternately from two separate d-c electrical sources.

Still another object of the invention is to provide a d-c to d-c converter of the foregoing type wherein one of the d-c electrical sources supplies only a portion of the total output power, namely the difference between the normally expected minimum power and a maximum allowable power output.

A further object of the invention is to provide a d-c to d-c converter wherein the voltage of one of the d-c electrical sources is automatically adjusted to maintain the voltage output substantially constant despite changes in load current or voltage of the other d-c source.

It is an additional object of the invention to provide a d-c to d-c high voltage converter having a high voltage multiplier energized directly from a pair of electrical sources through respective switches without any transformers in the power current paths.

Still another object of the invention is to provide a d-c to d-c high voltage converter capable of operating from either positive or negative input voltage.

In summary, the invention provides a high efficiency d-c to d-c converter having a regulated, high voltage output. The input power for the converter is supplied alternately from two d-c electrical sources. The voltage of one of the sources may be varied to maintain the high voltage output substantially constant, the variable voltage source supplying only the additional power needed to keep the output voltage constant despite variations in current drawn by a load or utilization device connected to the high voltage output or changes in voltage of the main d-c source.

BRIEF DESCRIPTION OF THE DRAWINGS

The single FIGURE is a combined schematic diagram and block diagram of circuitry embodying the invention.

DESCRIPTION OF A PREFERRED EMBODIMENT

Refering now to the single figure there is shown a d-c to d-c converter embodying the invention and comprised of a switching circuit 10, a capacitor-diode voltage multiplier circuit 11, and a control circuit section 12. The voltage multiplier circuit 11 includes capacitors $C_1$ through $C_N$ and diodes $D_1$ through $D_N$ connected as shown in a Cockroft-Walton type circuit. The high voltage output of voltage multiplier 11 is developed between output point 13 and a common point 14, the latter common point being electrically between diode $D_N$ and capacitor $C_{N-1}$.

The utilization device identified as $R_L$ is connected between output point 13 and common point 14 and may draw varying amounts of current from voltage multiplier 11. Rectangular voltage pulses which are supplied to voltage multiplier 11, as will be described presently, are applied between the common point 14 and an input point 15 which is, as shown, common to one side of capacitor $C_N$.

The switching circuit 10 includes a first d-c electrical source $V_1$ having its positive side connected via a lead 16 to common point 14 of the voltage multiplier 11 and its negative side connected through the emitter-collector path of transistor $Q_1$ to the input point 15 of voltage multiplier 11. However, the circuit also may be operated with opposite polarity on $V_1$ or $V_2$ with suitable changes in the switches used, as, for example, interchanging the collector and emitter.

The base electrode of transistor $Q_1$ is connected via a lead 17 and a pulse transformer 18 to the output of a monostable multivibrator 19. The monostable multivibrator 19 is triggered at a repetitive rate by a clock 20 such as a square wave ocillator running at a predetermined frequency. By utilizing high energy density capacitors $C_1$ through $C_N$ and low loss diodes $D_1$ through $D_N$, a frequency of 70 KHz has been found to be satisfactory. This permits the use of light, small capacitors.

Monostable multivibrator 19 provides no output until triggered by clock 20 whereupon it provides a "turn-on" pulse to transistor $Q_1$ and then returns to its stable off condition. The width or duration of the turn-on pulses is determined by the particular monostable multivibrator timing curcuit used. The timing circuit accordingly is selected to produce the desired pulse width or a multivibrator having an adjustment for the time of the output pulse may be used.

The voltage pulses supplied to voltage multiplier 11 from d-c source $V_1$ by the switching action of $Q_1$ produce negative voltage excursions at point 15 with respect to common point 14. To the end that positive going pulses may be applied to point 15 as needed to prevent the voltage across $R_L$ from decreasing as it utilizes more current, a second d-c electrical source $V_2$ is provided. The negative side of $V_2$ is connected to common point 14 while the positive side is connected through the emitter-collector path of a transistor $Q_2$ to input point 15 of the voltage multiplier 11.

The base electrode of transistor $Q_2$ is connected through a lead 21 and a pulse transformer 22 to the output of a monostable multivibrator 23 which, like multivibrator 19, is controlled by pulses from clock 20. The output pulses of multivibrators 19 and 23 alternate so that transistors $Q_1$ and $Q_2$ never conduct simultaneously but do conduct alternately at a predetermined rate determined by clock 20. The output pulses of multivibrator 19 are preferably equal in time duration to the output pulses of multivibrator 23 but this is not a necessary condition.

If the load $R_L$ for some reason begins to decrease or if the voltage of $V_1$ decreases, the voltage at the output means 13, 14 of multiplier 11 will accordingly decrease. To the end that the output voltage of multiplier 11 will be prevented from decreasing under these conditions and will be maintained substantially constant, the voltage $V_2$ is increased as much as necessary to cancel any decrease in the voltage of $R_L$. When the voltage $V_1$ or the current required by $R_L$ return to their normal minimum value, the voltage $V_2$ can be reduced to zero.

The voltage $V_2$ may be supplied by a suitable d-c power supply which may be adjusted manually to compensate for relatively slow changes in $V_1$ or in the current of $R_L$. In the specific embodiment shown, a capacitor $C_{V2}$ at a voltage $V_2$ receives rectangular voltage pulses to charge it to the desired voltage necessary to maintain the voltage of $R_L$ at a relatively constant value. The rectangular pulses used to charge the capacitor $C_{V2}$ may be either pulse width modulated or frequency modulated. The voltage on $C_{V2}$ is increased by either increasing the pulse repetition rate of the frequency modulated pulses or increasing the width of the width modulated pulses. Conversely, $V_2$ is decreased by decreasing pulse width or repetition rate.

The voltage pulses needed to charge capacitor $C_{V2}$ are obtained through a diode $D_{24}$ from an inductor $L_1$ in the embodiment shown. Inductor $L_1$ is serially connected with the collector-emitter path of a transistor $Q_3$ between the negative side of electrical energy source $V_1$ and the positive side of source $V_1$. The positive side of $V_1$ is connected through a lead 16 to the common point 14. Transistor $Q_3$ serves as a switching means to generate voltage pulses across inductor $L_1$. Each time transistor $Q_3$ switches off, current pulses pass through diode $D_{24}$ to charge $C_{V2}$ to the polarity as shown.

For a specific pulse width or on-time, it will be clear that if the repetitive rate of the pulses are increased the voltage $V_2$ will increase. Similarly, if the repetitive rate is kept constant and the ontime of transistor $Q_3$ is increased, the voltage on $V_2$ will increase. The latter pulse width modulation technique is used in the specific embodiment shown. As explained previously, $V_2$ supplies only the small amount of power necessary to maintain the voltage of $R_L$ at a constant value whereby the power controlled by the voltage regulating circuit is low. This results in very high efficiency and permits $V_2$ to be a capacitor thereby eliminating a heavy battery. However, $V_2$ can be a battery or a d-c power supply if weight is not an important consideration for the d-c to d-c converter.

All of the units shown in control circuit section 12 are well known, commercially available electronic modules. Other type voltage regulating circuits may be used if desired.

The pulse transformers 18, 22, and 26 each have a pair of leads from the secondary windings therein to the base-emitter electrodes of transistors $Q_3$ and $Q_2$, respectively. Reversing these leads will of course reverse the on-off sequence of the particular transistor to which they are connected. Accordingly, the leads should be connected so that $Q_1$ and $Q_2$ do not conduct simultaneously. Transistor $Q_3$, however, is not limited by any relationship of its switching frequency or on-off time to the conduction of transistors $Q_1$ and $Q_2$.

Switches $Q_1$, $Q_2$, and $Q_3$, all shown as transistors, may be fieldeffect transistors, controlled rectifiers or thyristors, or any other device which could be switched rapidly on or off. Also, PNP type semiconductors can be substituted for NPN types and vice-versa by observing correct polarities on the various components of the circuit.

It will be understood that changes and modifications may be made to the above described circuit without departing from the spirit and scope of the invention as set forth in the claims appended hereto.

What is claimed is:
1. A d-c to d-c converter comprising:
   a capacitor-diode multiplier having input means for connection to a source of electrical energy and output means for connection to a load;
   first and second d-c electrical sources, said second d-c electrical source being a capacitor;
   means for supplying unidirectional voltage pulses to said capacitor to produce d-c voltage thereon;
   first and second switch means, said first d-c electrical source and said first switch being serially connected across said input means, said second d-c electrical source and said second switch means being serially connected across said input means, said first and second electrical sources being oppositely poled; and means for repetitively and alternately closing and opening each of said switches whereby substantially rectangular voltage pulses are applied to said input means, said second electrical source being adjustable to compensate for changes in voltage of the other d-c source and in current drawn by said load.

2. The circuit of claim 1 and including means for automatically, compensatingly adjusting said second d-c source in response to incremental changes of voltage across said load.

3. The circuit of claim 1 wherein said means for supplying unidirectional voltage pulses to said capacitor is controlled by a voltage comparator means which increases or decreases the width of said voltage pulses to maintain the voltage of said load substantially constant.

4. The circuit of claim 1 wherein said means for supplying unidirectional voltage pulses to said capacitor comprises:
a third switch means and an inductor serially connected across the other d-c electrical source;
a unidirectional conducting device connected from a point between said third switch means and said inductor to a point between said capacitor and the switch means with which it is serially connected; and,
means for repetitively closing and opening said third switch at a predetermined rate.

5. The circuit of claim 4 wherein said third switch means is a unidirectional conducting device having at least two power electrodes and a control electrode to control conduction, said power electrodes being connected between said inductor and said other d-c electrical source and wherein said means for repetitively closing said third switch means at a predetermined rate is a voltage comparator supplying to said control electrode of said third switch means pulses the width of which increases or decreases in accordance with respective increases or decreases in current drawn by the load.

6. The circuit of claim 5 wherein said third switch means is a transistor, the power electrodes being a collector and an emitter and the control electrode being a base.

7. The circuit of claim 5 wherein said first and second switch means are semiconductors each having at least two power electrodes and a control electrode and including:
first and second pulse generators each having an output and an input, the outputs of said first and second pulse generators being severally connected to the control electrodes of said first and second switch means respectively;
a timing oscillator for generating timing pulses; and,
means for transmitting timing pulses from said timing oscillator to said inputs of said first and second pulse generators.

8. The circuit of claim 7 wherein said semiconductors are transistors, the power electrodes being a collector and an emitter in each transistor and the control electrode being a base.

9. The circuit of claim 1 wherein said first and second switch means are semiconductors each having at least two power electrodes and a control electrode and including:
first and second pulse generators each having an output and an input, the outputs of said first and second pulse generators being severally connected to the control electrodes of said first and second switch means respectively;
a timing oscillator for generating timing pulses; and,
means for transmitting timing pulses from said timing oscillator to said inputs of said first and second pulse generators.

10. The circuit of claim 9 wherein said semiconductors are transistors, the power electrodes being a collector and an emitter in each transistor and the control electrode being a base, one of said d-c electrical sources being of variable voltage whereby voltage at said output means may be maintained relatively constant as current drawn by said load varies.

11. The circuit of claim 1 wherein said voltage of said second d-c electrical source is variable from a predetermined value down to zero.

12. The circuit of claim 1 and including means for automatically, compensatingly adjusting said one d-c source in response to incremental change of current in said load.

13. The circuit of claim 1 where the voltage of said first and second d-c electrical sources is reversed.

* * * * *